(12) United States Patent
Lawandy

(10) Patent No.: US 6,259,506 B1
(45) Date of Patent: Jul. 10, 2001

(54) FIELD ACTIVATED SECURITY ARTICLES INCLUDING POLYMER DISPERSED LIQUID CRYSTALS, AND INCLUDING MICRO-ENCAPSULATED FIELD AFFECTED MATERIALS

(75) Inventor: Nabil M Lawandy, North Kingston, RI (US)

(73) Assignee: Spectra Science Corporation, Providence, RI (US)

( * ) Notice: Subject to any disclaimer, the term of this patent is extended or adjusted under 35 U.S.C. 154(b) by 0 days.

(21) Appl. No.: 09/102,786

(22) Filed: Jun. 23, 1998

Related U.S. Application Data

(63) Continuation-in-part of application No. 08/800,590, filed on Feb. 18, 1997, now abandoned.
(60) Provisional application No. 60/080,508, filed on Apr. 2, 1998.

(51) Int. Cl.$^7$ .................................................. G02F 1/13
(52) U.S. Cl. .......................... 349/193; 349/1; 349/86; 283/72; 283/90; 283/901
(58) Field of Search .................. 349/193–86; 283/72, 283/90, 901; 428/29

(56) References Cited

U.S. PATENT DOCUMENTS

| | | | |
|---|---|---|---|
| 4,048,359 | * | 9/1977 | Shibanai et al. ........................... 428/1 |
| 4,437,935 | | 3/1984 | Crane, Jr. ................................ 162/103 |
| 4,472,627 | * | 9/1984 | Weinberger ........................... 283/901 |

(List continued on next page.)

FOREIGN PATENT DOCUMENTS

| WO 98/03896 | 1/1998 | (WO) . |
|---|---|---|
| WO 98/19208 | 5/1998 | (WO) . |

OTHER PUBLICATIONS

"Preparation and characterization of polymer dispersed liquid crystal films using photosensitive polymers", Jui–Hsiang Liu et al., 1995 Huthig & Wepf Verlag, Zug CCC0003–3146/95, pp. 109–121.

"Polymer Dispersed Liquid Crystals Incorporating Isotropic Dyes", John L. West et al., SPIE Proceedings, 1080 (1989), 5 pages.

Characterization of polymer dispersed liquid–crystal shutters by ultraviolet/visible and Infrared absorption spectrosocpy, J.L. West et al., J. Appl. Phys. 70(7), Oct. 1, 1991, pp. 3785–3790.

"Photonic textile fibers", R. M. Balachandran, et al., Applied Optics, vol. 35, No. 12, Apr. 20, 1996, pp. 1991–1994.

*Primary Examiner*—Kenneth Parker
(74) *Attorney, Agent, or Firm*—Ohlandt, Greeley, Ruggiero & Perle, LLP

(57) ABSTRACT

In a first aspect this invention provides a security article comprising an electrically actuated optical switch comprised of a liquid crystal material. In one embodiment the liquid crystal material is disposed in a layer of polymer dispersed liquid crystal material. In a second embodiment the liquid crystal material is micro-encapsulated with an orientable dye. In a second aspect this invention provides a document or currency that comprises a paper matrix that includes at least one security article, i.e. a security thread. In a third aspect this invention provides a device for verifying an authenticity of a document or currency of a type that includes at least one security article, i.e. at least one security thread. The at least one security thread includes the liquid crystal material having a visual characteristic that is switched between two states as a function of a presence or absence of an electric field between first and second electrodes. In one embodiment the device for verifying the authenticity of the document or the currency includes an external pump source for generating a stimulated emission the at least one security article disposed within the document or currency. In one embodiment the external pump source includes a pulsed Nd:YLF laser, a frequency doubling KTP crystal and a device to provide stimulated Raman scattering.

4 Claims, 4 Drawing Sheets

U.S. PATENT DOCUMENTS

| | | | |
|---|---|---|---|
| 4,534,398 | 8/1985 | Crane | 162/103 |
| 4,536,014 | 8/1985 | Boutaleb et al. | 283/83 |
| 4,652,015 | 3/1987 | Crane | 283/91 |
| 4,702,558 | 10/1987 | Coles et al. | 350/330 |
| 4,736,425 | 4/1988 | Jalon | 380/59 |
| 4,761,205 | 8/1988 | Crane | 162/103 |
| 4,810,868 | 3/1989 | Drexler | 235/487 |
| 4,812,171 | 3/1989 | Brettle et al. | 106/21 |
| 5,248,544 * | 9/1993 | Kaule | 428/195 |
| 5,310,222 | 5/1994 | Chatwin et al. | 283/86 |
| 5,403,039 * | 4/1995 | Borowski, Jr. et al. | 283/87 |
| 5,448,582 | 9/1995 | Lawandy | 372/42 |
| 5,449,200 | 9/1995 | Andric et al. | 283/67 |
| 5,486,022 | 1/1996 | Crane | 283/83 |
| 5,508,068 | 4/1996 | Nakano | 428/1 |
| 5,587,820 | 12/1996 | May et al. | 359/72 |
| 5,630,869 | 5/1997 | Amon et al. | 106/31.37 |
| 5,678,863 * | 10/1997 | Knight et al. | 283/113 |
| 5,796,453 | 8/1998 | Nakao et al. | 349/86 |
| 6,062,604 * | 5/2000 | Taylor et al. | 283/72 |

\* cited by examiner

FIELD ACTIVATED SECURITY ARTICLES INCLUDING POLYMER DISPERSED LIQUID CRYSTALS, AND INCLUDING MICRO-ENCAPSULATED FIELD AFFECTED MATERIALS

CROSS-REFERENCE TO A RELATED APPLICATION

This patent application is a continuation-in-part of U.S. patent application Ser. No.: 08/800,590, filed Feb. 18, 1997 now abandoned, entitled "Field Activated Security Thread Including Polymer Dispersed Liquid Crystal", by Nabil M. Lawandy, the disclosure of which is incorporated by reference herein in its entirety. Priority is herewith claimed under 35 U.S.C. §119(e) from copending Provisional Patent Application No. 60/080,508, filed Apr. 2, 1998, entitled "A Security Thread Containing Particles or Fibers Which Produce A Laser Like Emission", by Nabil M. Lawandy. The disclosure of this Provisional Patent Application is incorporated by reference herein in its entirety.

FIELD OF THE INVENTION

This invention relates generally to document and currency authentication and, in particular, to security articles used in documents and currency.

BACKGROUND OF THE INVENTION

In a publication entitled "Preparation and characterization of polymer dispersed liquid crystal films using photosensitive polymers", Die Angewandte Mackromolekulare Chemie 231 (1995) 109–121 (Nr. 4051), J.-H. Liu, M.-Z. Chen and Y.-F. Wang report on the preparation of polymer dispersed liquid crystal (PDLC) films using a photosensitive technique.

As is reported by these authors, a light scattering state in an a.c. electric field off state depends on optical heterogeneities such as a spatial distortion of nematic directions and/or mismatching in refractive indices of the compounds. The light scattering and light switching properties of the composite films are decisively influenced by the phase separation structure of the composite films. The size of a liquid crystal domain (channel) can be controlled on the basis of the solvent evaporation rate or the curing rate during the separation of the composite film.

The authors employed commercial liquid crystals ZLI-2444, 2452, 2459, and BDH-E7 without further treatment. For the polymer matrix the authors used hydrophilic monomers of 2-hydroxythyl methacrylate (HEMA) and acrylic acid (Aa), hydrophobic monomers of methyl methacrylate (MMA) and styrene (St) that were purified by distillation in vacuo under nitrogen. 2-Methoxy-2phenylacetophenome (benzoin methyl ether, BME) was used without purification. The hydrophilic monomers were found to be suitable for the PDLC system. UV radiation was employed to photopolymerize the mixture, and it was found that sufficient UV irradiation was needed to complete the phase separation of the liquid crystals in the polymer matrix.

It is also known in the art to include isotropic dyes in an epoxy resin and liquid crystal when making optical shutters. The dye concentration can be adjusted to maximize the per cent transmission through the film between the on and off states. High contrast, colored displays have been made using an isotropic dye containing PDLC films and complementary colored backgrounds. Reference in this regard can be made to a publication entitled "Polymer Dispersed Liquid Crystals Incorporating Isotropic Dyes", SPIE Proceedings, 1080 (1989), J. L. West et al., and to a publication entitled "Characterization of polymer dispersed liquid-crystal shutters by ultraviolet/visible and Infrared absorption spectroscopy", J. Appl. Phys. 70(7), Oct. 1, 1991, pgs. 3785–3790, J. L. West et al. In U.S. Pat. No. 5,448,582, issued Sep. 5, 1995, entitled "Optical Sources Having a Strongly Scattering Gain Medium Providing Laser-Like Action", the inventor disclosed a multi-phase gain medium including an emission phase (such as dye molecules) and a scattering phase (such as $TiO_2$). A third, matrix phase may also be provided in some embodiments. Suitable materials for the matrix phase include solvents and polymers. The material is shown to provide a laser-like spectral linewidth collapse above a certain pump pulse energy. FIGS. 9a and 9b illustrate a display system embodiment having, in one embodiment, a liquid crystal display (LCD) array that is positioned adjacent to a surface of a pixel plane comprised of pixels or sub-pixels of the inventive gain medium. The LCD array is arranged so as to be selectively energized for passing the emission from the pixels through to an observer. The pixels operate so as to be substantially non-saturable and to output electromagnetic radiation within a narrow band of wavelengths.

It is well known in the art to use security articles, for example, security threads in paper to hinder a non-authorized production of the paper or to authenticate already manufactured paper and/or a document or currency printed on the paper. Reference in this regard can be had to the following U.S. patents: U.S. Pat. No. 5,486,022, "Security Threads Having At Least Two Security Detection Features and Security Papers Employing Same", by T. T. Crane; U.S. Pat. No. 4,534,398, "Security Paper", by T. T. Crane; and U.S. Pat. No. 4,437,935, "Method and Apparatus for Providing Security Features in Paper", by F. G. Crane, Jr.

OBJECTS AND ADVANTAGES OF THE INVENTION:

It is a first object and advantage of this invention to provide an improved security article for inclusion within documents and currency.

It is another object and advantage of this invention to provide an improved machine-readable security article for inclusion within documents and currency.

It is a further object and advantage of this invention to provide an improved security thread having a polymer dispersed liquid crystal material layer that is responsive to an applied electric field for varying a visual characteristic of the security thread.

It is a still further object and advantage of this invention to provide a security thread that includes a polymer dispersed liquid crystal material layer that includes an ink, such as a polymer-based ink, a solvent-based ink, or a water-based ink, wherein the security thread is responsive to an applied electric field for varying a visual characteristic of the security thread.

It is another object and advantage of this invention to provide an improved security article having micro-encapsulated liquid crystal material that is responsive to an applied electric field for varying a visual characteristic of the security article.

It is still another object and advantage of this invention to provide a security article that includes micro-encapsulated liquid crystal material having at least one orientable dye, such as a dichroic or an isotropic dye, wherein the security article is capable of laser-like action when excited by a source, and wherein the laser-like action can be switched on and off by switching an electric field on or off.

It is still another object and advantage of this invention to provide a security article that is capable of laser-like action when excited by an essentially solid-state optical source, and wherein the laser-like action can be switched on and off by switching an electric field on or off.

Further objects and advantages of this invention will become more apparent from a consideration of the drawings and ensuing description.

SUMMARY OF THE INVENTION

The foregoing and other problems are overcome and the objects and advantages of the invention are realized by the embodiments of this invention.

In a first aspect this invention provides a security article, i.e. a security thread, comprising an electrically actuated optical switch comprised of a liquid crystal (LC) material. In one embodiment, the LC material is disposed in a layer of polymer dispersed liquid crystal material. In another embodiment, the security thread comprises a plurality of micro-capsules which include the LC material and an orientable dye.

In a second aspect this invention provides a document or currency that comprises a paper matrix that includes at least one security article, the at least one security article being comprised of at least one layer of electrically actuated liquid crystal material. The electrically actuated liquid crystal material being responsive to an applied electric field for varying a visual characteristic of the security article. In one embodiment a security thread comprises a plurality of micro-capsules that contain the electrically actuated LC material.

In a third aspect this invention provides a device for verifying an authenticity of a document or currency of a type that includes at least one security thread. The device includes first and second electrodes and an excitation source coupled to the electrodes. The first and second electrodes are spaced apart for accommodating therebetween the document or currency, and at least one of the electrodes is transparent. The at least one security thread includes at least one layer of polymer dispersed liquid crystal material having a visual characteristic that is switched between two states as a function of a presence or absence of an electric field between the first and second electrodes.

In a preferred embodiment of this invention polymer dispersed liquid crystal material is used in combination with one of a polymer-based ink, a solvent-based ink, or a water-based ink. In the polymer-based ink embodiment the polymeric material of the selected ink is the polymer in which the LC material is dispersed.

In accordance with a further embodiment of this invention a security article has a plurality of micro-capsules including liquid crystal material and at least one orientable dye, such as a dichroic or an isotropic dye, wherein the security article is capable of laser-like action when excited by a source, and wherein the laser-like action can be switched on and off by switching an electric field on or off.

In a further embodiment of this invention there is disclosed a security article that includes a plurality of micro-capsules that contains liquid crystal material and a material for generating a stimulated emission, in response to an optical pump, and scattering sites for scattering the stimulated emission. In this embodiment the liquid crystal material function as the scattering sites, either alone or in combination with additional scattering sites. When the security article is placed between first and second electrodes for establishing an electric field through the security article, a spectrally and temporally collapsed laser-like emission can be turned on or off by the presence or absence, respectively, of an electric field between the associated pair of electrodes.

BRIEF DESCRIPTION OF THE DRAWINGS

The above set forth and other features of the invention are made more apparent in the ensuing Detailed Description of the Invention when read in conjunction with the attached Drawings, wherein.

Identically labelled elements appearing in different ones of the above described figures refer to the same elements but may not be referenced in the description for all figures.

DETAILED DESCRIPTION OF THE INVENTION

The disclosure of the above-referenced U.S. Pat. No. 5,448,582, issued Sep. 5, 1995, entitled "Optical Sources Having a Strongly Scattering Gain Medium Providing Laser-Like Action", by Nabil M. Lawandy is incorporated by reference herein in its entirety. Also incorporated by reference herein in its entirety is the disclosure of U.S. Pat. No. 5,434,878, issued Jul. 18, 1995, entitled "Optical Gain Medium Having Doped Nanocrystals of Semiconductors and also Optical Scatterers", by Nabil M. Lawandy.

Figure 1A:
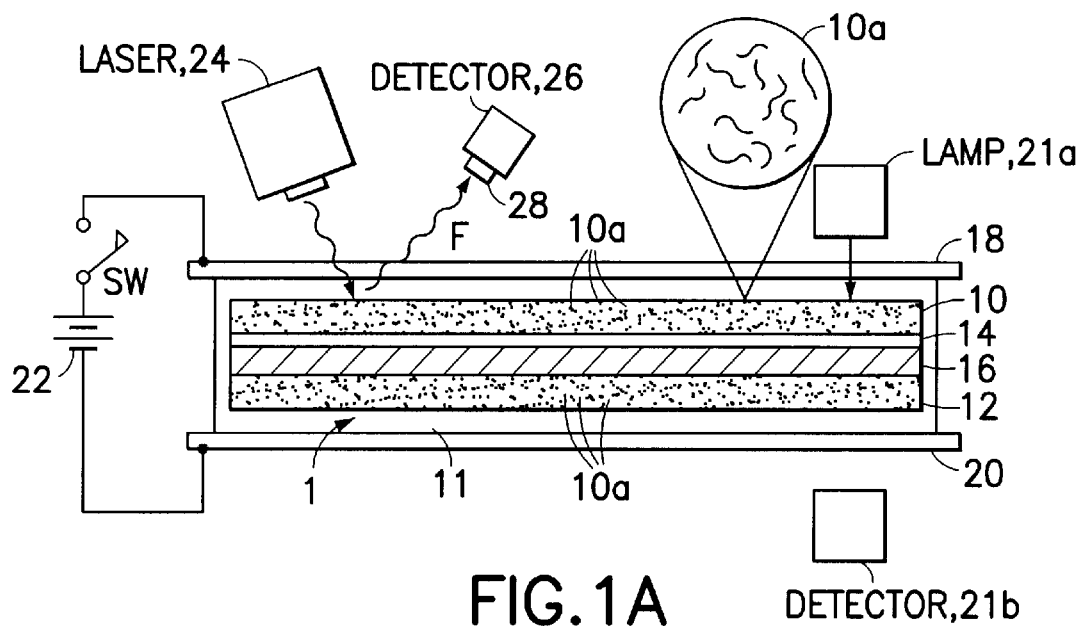
FIGS. 1A and 1B are each a cross-sectional view, not to scale, showing a security thread and the operation of liquid crystal materials without and with, respectively, an applied electric field.
Figure 1B:
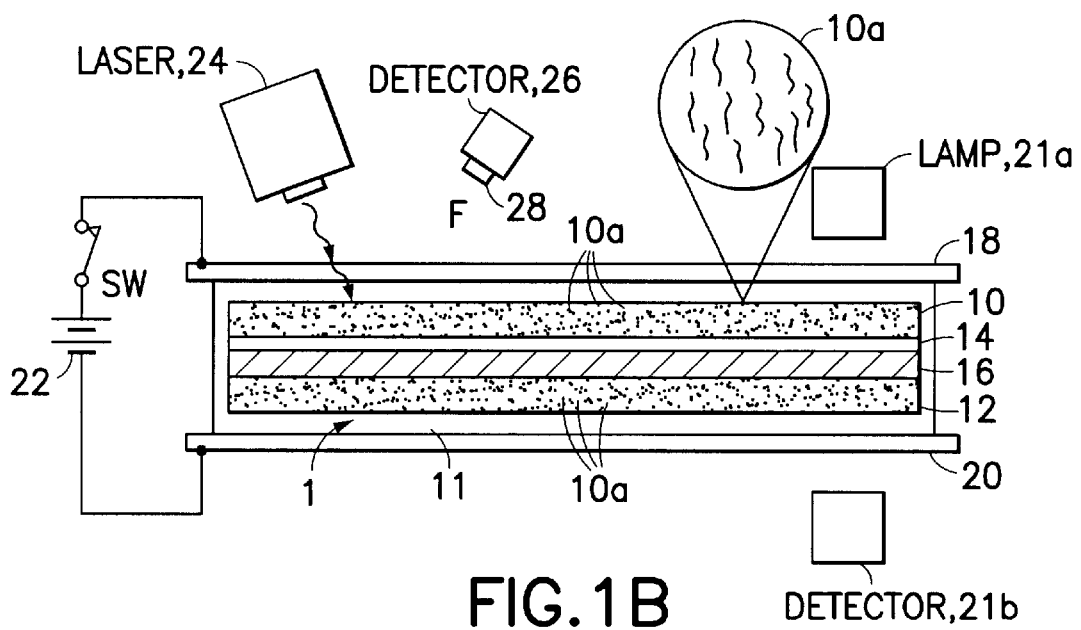

Reference is made to FIGS. 1A and 1B for illustrating an improved security article, such as a security thread 1 in accordance with this invention, as well as a device for activating the security thread 1. The security thread 1 is a multilayered structure that includes liquid crystal (LC) material, i.e. LC domains 10a, disposed on outer layers 10 and 12. Inner layers are comprised of a polyester or any suitable flexible thread-like material layer 14 and a thin metal layer 16, such as, for example, a layer of aluminum foil. The outer layers 10 and 12 are comprised of a suitable matrix material, for example, a polymer matrix having an exemplary thickness of about 5 micrometers. The layers 10 and 12 can be fabricated in accordance with, by example, the procedure disclosed in the above-mentioned journal article by J.-H. Liu et al.

In one embodiment of the present invention, the LC domains 10a disposed on the outer layers 10 and 12 are disposed within a polymer dispersed liquid crystal (PDLC) material. In another embodiment of the present invention, illustrated in FIGS. 5A and 5B, the LC domains 10a and an orientable absorber dye 10b are micro-encapsulated to form, for example, a powder. The powder containing microcapsules 13 is used to make security articles, such as the security thread 1. The powder may also be intermixed with a matrix material suitable for providing the desired document or currency. The suitable matrix material may be, for example, an ink, a paper, a textile, or a polymeric material matrix.

The micro-encapsulation of the LC domains 10a and the dye 10b can be accomplished in accordance with, by example, procedures disclosed in U.S. Pat. No. : 3,956,172, issued May 11, 1976, entitled "Process for Hardening Microcapsules containing Hydrophobic Oil Droplets", by Saeki et al., U.S. Pat. No. : 4,808,408, issued Feb. 28, 1989, entitled "Microcapsules prepared by Coacervation", by Baker et al., U.S. Pat. No. : 5,053,277, issued Oct. 1, 1991, entitled "Microcapsules and their Production", by Vassiliades, U.S. Pat. No. : 5,397,624, issued Mar. 14, 1995, entitled "Pressure-sensitive Copying Paper", by Moyaerts et al. In accordance with the present invention, the microcapsules 13 are of a diameter in the range of about two micrometers to some hundreds of micrometers.

Thus, according to the micro-encapsulation technique taught by Baker et al. (U.S. Pat. No. : 4,808,408) a core ingredient of the LC domains 10a and the orientable absorber dye 10b is micro-encapsulated by, for example, (1) mixing a coacervation adjuvant with the core ingredient, (2) emulsifying the mixture in an aqueous solution of an ionizable colloid, (3) combining, while agitating, the emulsion of step (2) with an aqueous solution of a second ionizable colloid of opposite electrical charge to that of the first colloid, (4) cooling the mixture to cause gelation of capsule walls, (5) adding a water soluble wax derivative to stabilize the gelled capsules and to prevent agglomeration, and (6) hardening the capsule walls. When the above steps are completed the micro-capsules 13 are dried to form the powder which is intermixed with the suitable matrix material to provide the desired document or currency.

In the present invention, a first mixture is formed which contains the PDLC and the LC domains 10a disposed therein. The first mixture is used to coat on the layers 14 and 16, and is then dried or cured, depending on the liquid polymer. Alternatively, the micro-capsulated LC domains 10a and the orientable absorber dye 10b are added to a liquid polymer to form a second mixture. The second mixture, like the first mixture, can be used to coat on the layers 14 and 16, and then dried or cured, as appropriate.

During the drying or curing process the LC domains 10a of either the first or the second mixture form within the surrounding polymer matrix, which is the desired result. The dried or cured polymer matrix may also function as a protective coating for the layers 14 and 16 of the security thread 1. In one embodiment of this invention the polymer matrix can be a transparent varnish or some other suitable coating material selected to adhere to the layers 14 and 16.

It is within the scope of this invention to vary the configuration of the security article. That is, it is within the scope of this invention for the security article to be of any suitable form that can be disposed within the desired document or currency. For example, a security article or object may be configured as the security thread 1, shown in FIG. 1A and 1B, or a security disk or planchet.

As discussed above, security articles, such as the security thread 1, that are used in documents or currency are typically comprised of a polyester material coated with an extender material (e.g., a water or a solvent-based polymer coating). In some cases, two polyester sheets are sandwiched together with another polymeric material disposed in between them. This sandwiched configuration is then coated with the extender material before being incorporated into the document or currency. The extender and/or the sandwiched layers can be doped with phosphers or fluorescing materials to provide a public security feature activated by a UV lamp.

In addition to the phosphor or fluorescing materials, the security thread may also contain particles or fibers which produce a laser-like emission. For example, thin micron scale fibers, planchets or particles comprised of a substrate and containing gain media may be incorporated within the security thread 1. These fibers may have diameters of, for example, about 1–10 micrometers and lengths of the order of a millimeter. If added to the security thread in a dilute manner, their appearance as well as their possible fluorescence can be hidden. The hidden fibers can then be excited by an external source, for example, a laser, in order to emit specific narrow band wavelengths, or combinations of wavelengths to authenticate or identify the secure documents or banknotes.

It is also within the scope of this invention to selectively cure the security object, i.e. the security thread 1, with UV light or some other mechanism, such as a thermal process, so as to pattern one or both of the layers or films 10 and 12. By example, and referring to FIG. 2C, a striped pattern can be formed by applying UV light through a suitable mask. In this case the LC domains 10a, e.g., the LC domains disposed in the PDLC or the LC domains 10a micro-encapsulated with the orientable absorber dye 10b, are formed only in the irradiated regions. This selective forming of the LC domains 10a results in a visually distinctive appearance when compared to a security article or object, i.e. the security thread 1, wherein the entire layer 10 and 12 contains the LC domains 10a.

The resulting security article, i.e. the security thread 1, is then placed into a matrix material such as, for example, a paper matrix 11, that can be printed on to provide the desired document or currency. In order to activate the security article or object, i.e. the security thread 1, it is necessary to apply an electric field. In this case the paper matrix 11 containing the security article or object is placed between opposed electrodes 18 and 20 (as shown in FIGS. 1A & 1B) that define a viewing area that encompasses all or a portion of the paper, document or currency within which the security thread 1 is disposed. The paper, document or currency may include a plurality of such security articles or objects, i.e. security threads 1, arranged in random or predetermined ways. At least one of the electrodes 18 and 20 is comprised of a transparent material such as indium-tin-oxide (ITO) or a thin, transparent film of a metal such as, for example, gold. The electrodes 18 and 20 may also be provided on surfaces of transparent electrode substrates (such as glass), which are then arranged so as to place the electrodes 18 and 20 adjacent to the opposing major surfaces of the paper matrix 11 containing the security thread 1.

Coupled to the electrodes 18 and 20 is a suitable electrical excitation source 22 (shown as a battery) that is connected to the electrode 18 through a switch SW. A suitable potential for the source is in the range of, for example, 1V to 2V per micrometer. In FIG. 1A the switch SW is shown as being open, while in FIG. 1B the switch SW is shown as being closed. The switch SW being closed establishes an electric field through the intervening portion of the polymer matrix that contains the LC domains 10a, e.g., the LC domains disposed in the PDLC or the LC domains microencapsulated with the orientable absorber dye. This causes the LC molecules within the LC domains 10a to align with the electrical field (as shown in the enlarged view of FIG. 1B) in a known manner. By contrast, the LC molecules in the LC domains 10a within a portion of the polymer matrix that is not subjected to an electric field remain in a random orientation, as shown in FIG. 1A.

When the LC molecules within the LC domains 10a are aligned, the composite index of refraction of the LC domains 10a more nearly matches that of the surrounding polymer matrix. As a result, the optical absorption of the layers 10 and 12 is reduced, rendering the underlying layer or layers 14 and 16 visible. By contrast, the random orientation of the LC molecules provides a composite index of refraction which is not matched with the index of the surrounding polymer matrix. As a result, the LC domains 10a functions to absorb incident light and to prevent the light from reaching and/or reflecting from the underlying layer 14 or 16.

Figure 2A:
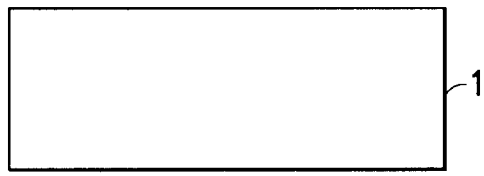
FIGS. 2A and 2B are each a top view of the security thread of FIGS. 1A and 1B, and illustrate a visual appearance of the security thread for a field off and a field on case, respectively.
Figure 2B:
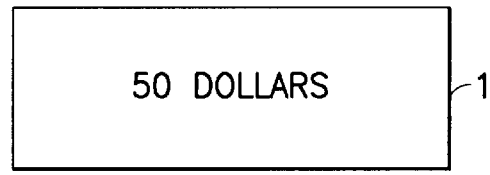

In this invention the properties of aligned and non-aligned LC molecules are employed to provide a security article or object capable of assuming two distinct visual characteristics. Referring to FIG. 2A, in a first visual characteristic the LC molecules are not aligned, and the visual characteristic of the security article, e.g., security thread 1, may be that of an essentially opaque, featureless substrate. Referring to FIG. 2B, in a second visual characteristic the LC molecules are aligned by the electric field applied by transparent electrodes 18 and 20 in cooperation with excitation source 22, and the visual characteristic of the security thread 1 is determined by the underlying layer or layers 14 and 16. That is, when the LC molecules of the LC domains 10a are aligned by the electric field caused by closing the switch (SW) of FIG. 1B, the LC domains 10a become substantially transparent. Assuming that one or both of the underlying layers 14 and 16 has a distinct visual characteristic, such as being colored, or patterned, and/or printed with an indicia (such as in FIG. 2B), then the security thread 1 takes on the visual characteristic of the one or more of the underlying layers 14 and 16. Alternatively, a document or currency may include an ink which contains the LC domains 10a. The LC domains 10a may be, for example, initially opaque, that when excited by the excitation source 22 become transparent to expose a visual characteristic of an underlying layer, such as shown in FIG. 2B.

Figure 2C:
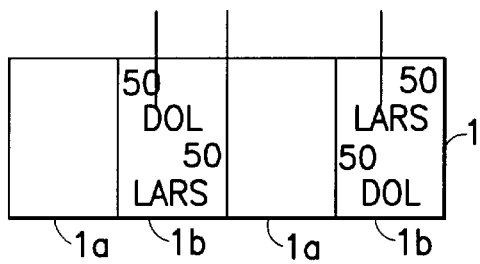
FIG. 2C is a top view of a security thread having patterned liquid crystal material.

FIG. 2C illustrates an embodiment of the above-mentioned selectively cured security article. In this embodiment the security article contains regions 1a without the LC domains 10a, and regions 1b with the LC domains 10a. Only in the regions 1b containing the LC domains 10a does the presence of the electric field result in the underlying layer becoming visible. The underlying layer may be colored and/or may include an indicia that becomes visible only in the regions 1b.

Figure 2D:
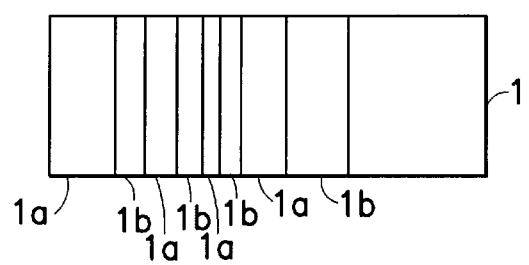
FIG. 2D is a top view of a security thread having bar code patterned liquid crystal material.

FIG. 2D illustrates a further embodiment of the invention, wherein all or a portion of the layers 10 and/or 12 are patterned in accordance with a bar code. For currency, the bar code can encode, for example, the denomination, serial number, and/or any other desired information. When the regions containing the LC domains 10a are activated by the electric field, an underlying portion of the layer 14 or 16 is made visible, which may be colored black or some other color selected to provide a high contrast ratio.

It can be realized that the outer layers 10 and 12 of a security article, such as a security thread 1, function as an electrically actuated optical switch. When off, the layers containing the LC domains 10a prevent an observer from seeing the underlying layers 14 and 16, while when on these layers become visible.

In other embodiments of this invention one or more dyes or phosphors can be added to the polymer material that comprises the layers 10 and 12. By example, one or more isotropic or dichroic dyes can be added to the polymer matrix and LC domains 10a disposed within the PDLC. After formation within the PDLC the dye or dyes become oriented or aligned with the bulk alignment of the LC molecules in the presence of the electric field. When so oriented the optical absorption of the dye or dyes is significantly reduced, resulting in a considerable contrast enhancement between the on and off states of the LC domains 10a disposed within the PDLC. Any of the dyes listed in the above-referenced West et al. publications can be employed for this purpose.

Figure 5A:
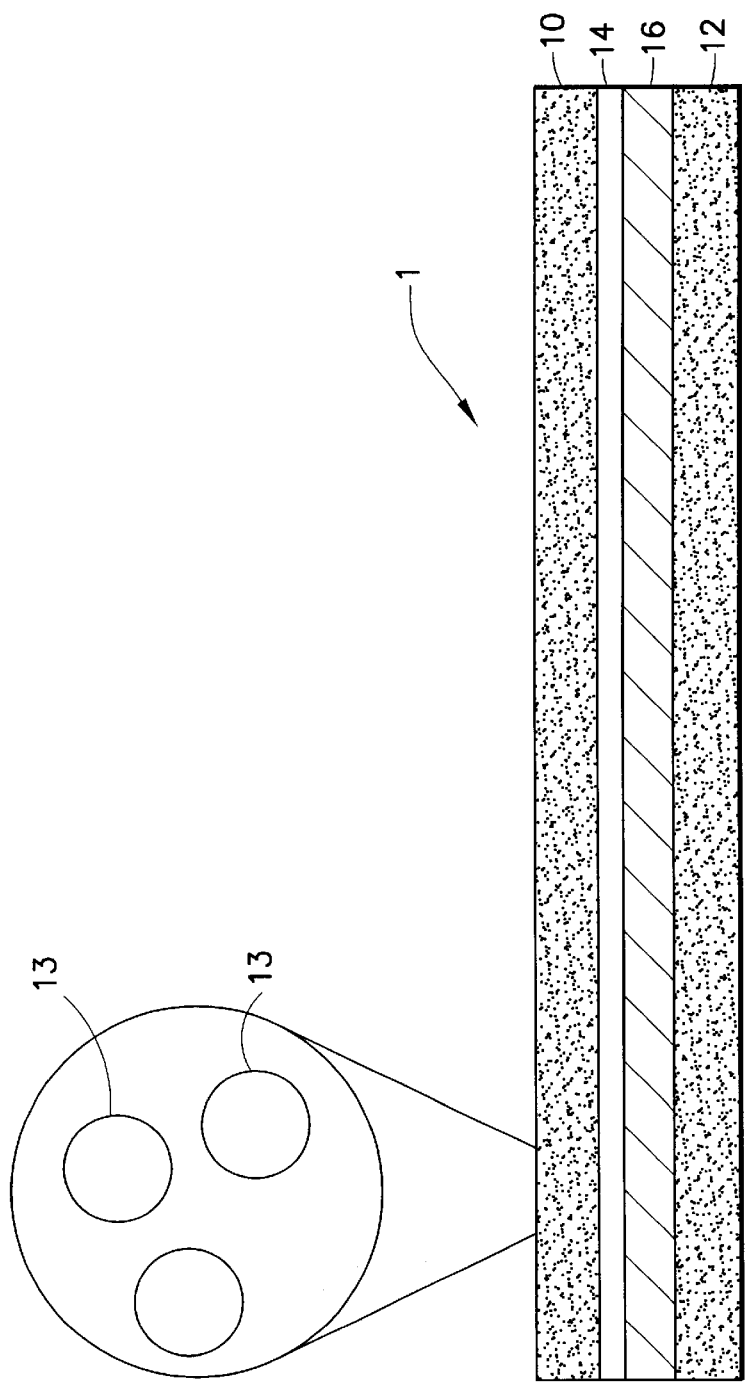
FIG. 5A is a cross-sectional view, not to scale, showing a security thread and micro-encapsulated liquid crystal materials.
Figure 5B:
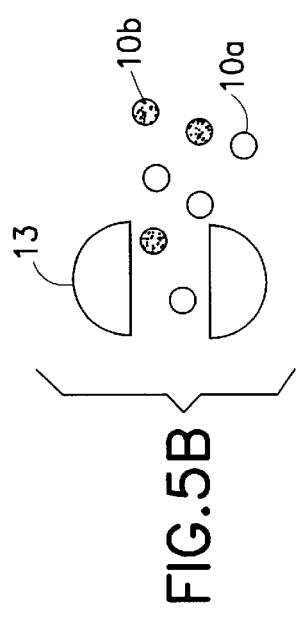
FIG. 5B is an exploded view of a micro-capsule which includes liquid crystal material and an orientable absorber dye.

In still other embodiments of this invention, shown in FIGS. 5A and 5B, the orientable absorber dye 10b that is micro-encapsulated with the LC domains 10a is, for example, the one or more isotropic or dichroic dyes discussed above. After formation of the micro-capsules 13, the dye 10b or dyes become oriented or aligned with the bulk alignment of the LC molecules in the presence of the electric field. As described above, when so oriented the optical absorption of the dye 10b or dyes is significantly reduced, resulting in a considerable contrast enhancement between the on and off states of the LC domains 10a within the micro-capsules 13.

In a still further embodiment of this invention the LC domains 10a can be added to the polymeric material of the layer 14, and not to the layers 10 and 12. In this case the layers 10 and 12 may be eliminated, or can be retained for providing a protective coating for the layers 14 and 16.

It is also within the scope of this invention to provide a field activated security ink wherein a suitable ink type, such as an Intaglio printed solvent-based ink, a water-based ink, or a polymer-based ink, is combined with the PDLC material. When activated, the visual effect is a total or partial disappearance of an indicia formed with the ink-containing PDLC, and/or a visual contrast in a security thread containing the field activated security ink. The visual characteristic of a security article which incorporates the field activated security ink is substantially similar to the visual characteristics of the security thread 1 discussed above with reference to FIGS. 2A and 2B.

In this regard, all inks consist of a binder and a solvent to dissolve a pigment and make the ink printable. By example, newspaper ink includes mineral oil and carbon black. In this case the mineral oil serves as both the solvent and the binder. Examples of polymer-based inks include heat or UV-curable inks. In these systems the binder is the polymer which is activated by heat or light. This serves to remove the solvent and to cause the polymer to cross-link, making it adhere to a substrate.

In accordance with an aspect of this invention, the polymeric material of a polymer-based ink is the polymer in which the LC domains 10a are distributed.

Figure 3A:
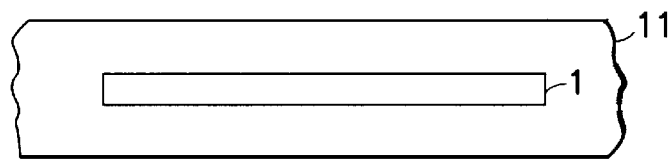
FIGS. 3A and 3B are each a cross-sectional view of a paper matrix, and illustrate the use of the security thread in a buried and in a windowed configuration, respectively, within the paper matrix.
Figure 3B:
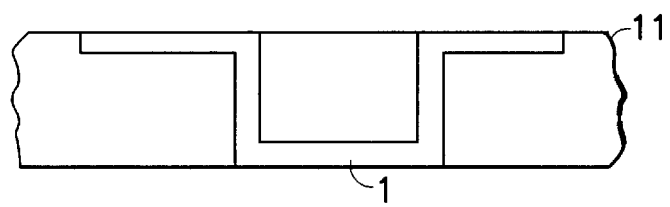

FIGS. 3A and 3B illustrate the use of the security article, e.g., a security thread 1 in a buried configuration (as also shown in FIGS. 1A and 1B), and in a windowed configuration, respectively, within the paper matrix 11. It can be appreciated that the use of the security thread 1 provides both a public security feature and a machine readable security feature that can be readily verified using a low cost and simple reading apparatus. By example, in FIGS. 1A and 1B there is shown a lamp 21a and an optical detector 21b which are arranged for sensing a difference in light transmission and/or reflection due to the activation of the LC material. For example, the metal layer 16, if used, may have openings or apertures that permit light from the lamp 21a to pass through to the photodetector 21b.

Furthermore, the use of the security thread 1 can be coupled with additional security features. By example, and referring again to FIGS. 2B and 2C, the foil layer 16 could be printed with a holographic pattern that is only visible when an electric field of a suitable magnitude is applied across the paper matrix 11. In this case a document or currency containing the security thread 1 would be verified as being authentic only when an applied electric field renders an expected holographic pattern visible to an observer.

It is also within the scope of this invention to elicit a laser-like emission from the security thread 1 by modifying one or both of the layers 10 and 12 during fabrication to include a gain medium of a type disclosed in the above-referenced U.S. Pat. No. 5,448,582. By example, the layers 10 and/or 12 include dye molecules and may optionally contain scattering particles or sites. The dye molecules are selected to provide a desired color or emission wavelength. An exemplary dye molecule concentration is in the range of about 5 millimoles to about 10 millimoles. The scattering particles, which may be $TiO_2$ or alumina, are optionally employed to provide some degree of scattering, but not an amount sufficient to provide a laser-like emission from the layers 10 and/or 12. When the switch SW of FIG. 1B is closed it establishes the electric field through the intervening portion of the layers 10 and 12. This causes the LC molecules within the LC domains 10a to align with the electrical field in a known manner. As was noted above, when the LC molecules within the LC domains 10a are aligned, the composite index of refraction of the LC domains 10a more nearly matches that of the surrounding polymer matrix. In contrast, the random orientation of the LC molecules (as occurs when the switch SW is open, as in FIG. 1A) provides a composite index of refraction which is not matched with the index of the surrounding polymer matrix. As a result, each such LC domain 10a functions as a scattering site which, in combination with the dye molecules, provides a laser-like emission from the layers 10 and or 12 when excited by an external pump source, such as, for example, a laser (shown as a laser 24 in FIGS. 1A and 1B). The presence of the laser-like emission having a specified narrow bandwidth can be detected by a suitable optical detector 26 that is fitted with a narrow passband filter (F) 28.

Additional scattering sites may be provided so as to "bias" the material of the layers 10 and 12 below the point required to support the laser-like emission. In this case the additional scattering provided by the LC domains 10a having LC molecules in the random orientation as in FIG. 1A is sufficient to exceed the threshold required to support the laser-like emission, whereas the reduction in scattering caused by the aligned LC domains 10a of FIG. 1B is not sufficient to support the laser-like emission.

In this embodiment of the invention these properties of aligned and non-aligned LC molecules are employed to provide a high brightness and high contrast security article. It can thus be appreciated that the teaching of this invention provides an electrically actuated lasing security article having a large contrast between the on and off states.

Figure 4:
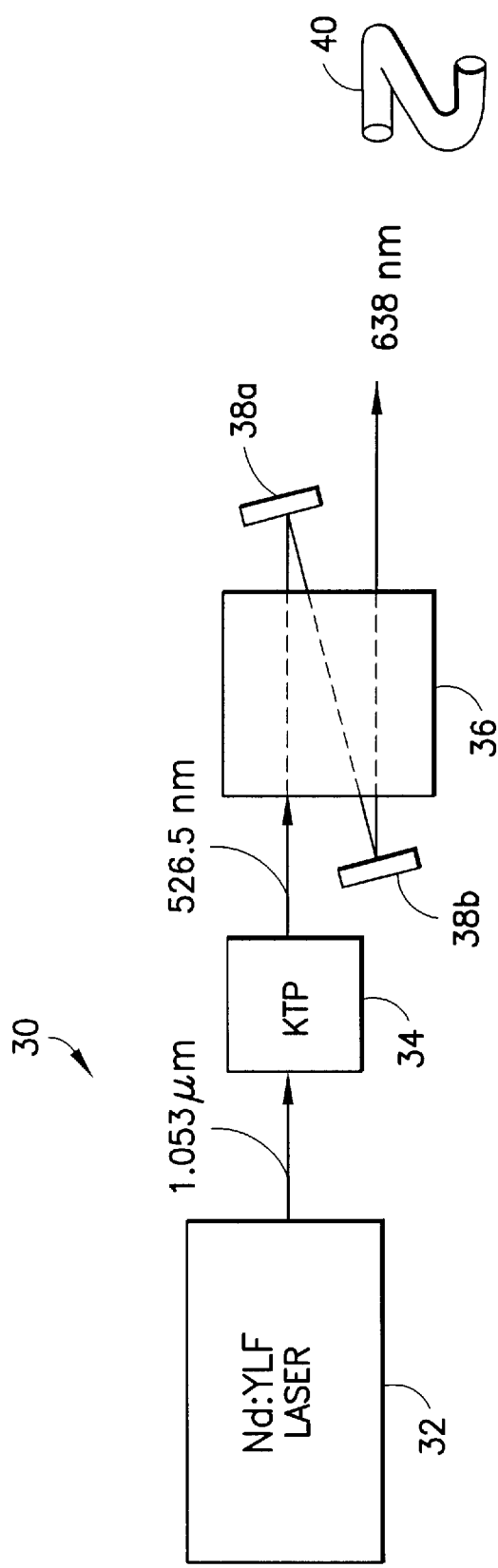
FIG. 4 is a simplified block diagram of an essentially solid-state optical source in accordance with the present invention.

In a further embodiment of this invention shown in FIG. 4, an external pump source 30 (shown in FIGS. 1A and 1B as the laser 24) includes a pulsed Nd:YLF laser 32, i.e., Yttrium Lithium Fluoride ($YLiF^4$) in a $Nd^{3+}$ laser host material. The Nd:YLF laser 32 operates, for example, at 1.053 $\mu$m or 1.06 $\mu$m, and may have a 5–300 nanosecond pulse width and a 10–30 KHz pulse repetition rate. The output of the Nd:YLF laser 32 is frequency doubled, such as with, for example, a KTP crystal 34, or an equivalent frequency doubler.

A 526.5 nm, or a 532 nm, output of the KTP crystal 34 is then shifted by stimulated Raman scattering or an equivalent technique with a $Ba(NO_3)_2$ (or equivalent) crystal 36 to nominally 638 nm (i.e., 638 nm±0.1 nm), or any other suitable Stokes wavelength. In one embodiment the Raman shifting is accomplished in a multi-pass configuration (i.e., three passes through the $Ba(NO_3)_2$, or equivalent crystal 36). Thus, mirrors 38a and 38b are provided to establish a suitable multi-pass optical path. It is also within the scope of this invention to accomplish the Raman shifting in a resonant cavity configuration, as shown more particularly in FIG. 3 of copending U.S. patent application Ser. No.: 08/788,208, filed Jan. 24, 1997, entitled "Solid State Source For Generating Intense Light For Photodynamic Therapy And Photomedicine", by Nabil M. Lawandy, the disclosure of which is incorporated by reference herein in its entirety.

Optionally, the 638 nm light (capable of producing a fluence of the order of 1 $mJ/cm^2$) is directed into an optical fiber, catheter, or any suitable device 40 for delivering the 638 nm light to a region of interest. By example, the device 40 may be an optical fiber for directing the 638 nm light to excite the LC domains 10a of the security article to emit the laser-like emissions.

In greater detail, the $Ba(NO_3)_2$ crystal 36 (nominally about 1–5 cm in length) is employed to Raman shift the output of the solid state laser 32 to the required wavelengths suitable to elicit a laser-like emission from the security thread 1. In one embodiment of the invention, a multi-pass configuration is used which allows for the generation of the desired wavelength or wavelengths (e.g., 638 nm) by several Stokes Raman conversions. As was noted previously, a resonant cavity configuration can also be employed. In the resonant cavity configuration the crystal 36 is disposed between mirrors which define a resonant cavity around the crystal 36. A first mirror is, for example, a dichroic mirror that is transmissive to the input frequency doubled light, and is reflective to the Stokes lines of interest (e.g., lines 1–3 for the 638 nm embodiment and lines 1–4 for the 675 nm embodiment). A second mirror is, for example, partially transmissive to the Stokes line (e.g., third or fourth) that is the desired wavelength. The resonant cavity configuration is discussed in greater detail within the disclosure of the above-identified copending U.S. patent application Ser. No. 08/788,208.

A specific case is the illustrated use of the Nd:YLF laser 32 which is frequency doubled to 526.5 nm as a pump source (FIG. 4). A three pass geometry is used to create the third Stokes line at 638 nm, with conversion efficiencies exceeding 25%. However, other configurations can be used, such as cavities or multi-pass White cells, to produce the desired wavelengths. These modifications are well within the capabilities of those skilled in the art, when guided by the teachings of this invention.

Referring again to FIGS. 1A and 1B, and in a still further embodiment of this invention, the dye molecules may be replaced by semiconductor nanocrystals selected for their emission wavelength(s) (e.g., GaN for blue, ZnSe for green, CdSe for red). In this case the semiconductor nanocrystals may also function as scattering sites for the stimulated emission in combination with the LC domains 10a. In a still further embodiment of this invention the polymer matrix of the layers 10 and 12 may itself provide the stimulated emission, such as a polymer matrix comprised of, by example, PPV, MEHPPV, BuEH-PPV, BEH-PPV, HEH-PF, or CN-PPP.

In the various embodiments of the invention described above the outer layers 10 and 12 may have a thickness of, by example, 5–10 micrometers. An electric potential in the range of approximately 15–50 volts is sufficient to align the LC molecules within the LC domains 10a.

Although described above in the context of specific materials, thicknesses, potentials, dimensions and the like, it should be appreciated that the teaching of this invention is not intended to be limited to only these disclosed exemplary embodiments and values. Neither is the teaching of this invention intended to be limited to only the specific electric field generating technique and apparatus described above.

As such, while the invention has been particularly shown and described with respect to preferred embodiments thereof, it will be understood by those skilled in the art that changes in form and details may be made therein without departing from the scope and spirit of the invention.

What is claimed is:

1. A device for verifying an authenticity of a document or currency of a type that includes at least one security thread, comprising first and second electrodes and an excitation source coupled to said electrodes, said first and second electrodes being spaced apart for accommodating therebetween said document or currency, at least one of said electrodes being transparent, said at least one security thread being comprised of at least one layer of polymer dispersed liquid crystal material having a visual characteristic that is switched between two states as a function of a presence or absence of an electric field between said first and second electrodes, wherein said polymer is comprised of an ink.

2. A security article, comprising at least one layer that contains an optical gain medium and a plurality of micro-capsules that contain an electrically actuated optical switch comprised of liquid crystal material.

3. A security article as set forth in claim 2, wherein when excited said optical gain medium emits a laser-like emission of one of a desired color or a desired wavelength.

4. A security article, comprising at least one layer comprised of a plurality of micro-capsules that contain liquid crystal material and a material for generating a stimulated emission, in response to an optical pump, and electrically activated scattering sites for scattering said stimulated emission.

* * * * *